(12) United States Patent
Robb

(10) Patent No.: US 7,052,398 B2
(45) Date of Patent: May 30, 2006

(54) PRESSURE REGULATOR ASSEMBLY FOR USE WITH A SLIP JOINT IN A DRIVESHAFT ASSEMBLY

(75) Inventor: Scott B. Robb, Toledo, OH (US)

(73) Assignee: Torque-Traction Technologies, Inc., Maumee, OH (US)

( * ) Notice: Subject to any disclaimer, the term of this patent is extended or adjusted under 35 U.S.C. 154(b) by 104 days.

(21) Appl. No.: 10/224,957

(22) Filed: Aug. 21, 2002

(65) Prior Publication Data

US 2003/0045361 A1 Mar. 6, 2003

Related U.S. Application Data

(60) Provisional application No. 60/314,127, filed on Aug. 22, 2001.

(51) Int. Cl.
*F16N 11/04* (2006.01)

(52) U.S. Cl. .............................. 464/16; 464/7; 184/95

(58) Field of Classification Search .................. 464/7, 464/16, 158, 162, 170, 172, 179, 185; 184/94, 184/95, 100, 88.1
See application file for complete search history.

(56) References Cited

U.S. PATENT DOCUMENTS

| 1,694,153 A | * | 12/1928 | Watres ...................... 184/45.1 |
| 2,116,290 A | | 5/1938 | Spicer |
| 2,239,192 A | | 4/1941 | Cutting |
| 2,371,250 A | | 3/1945 | Maroney |
| 2,859,598 A | * | 11/1958 | Hochreuter ...................... 464/7 |
| 3,052,475 A | | 9/1962 | Carfagna |
| 3,210,137 A | * | 10/1965 | Williams ...................... 384/155 |
| 3,357,208 A | * | 12/1967 | Chase ........................ 464/16 |
| 3,543,536 A | * | 12/1970 | Rekow ........................ 464/16 |
| 3,633,383 A | | 1/1972 | Kleinschmidt |
| 4,125,000 A | | 11/1978 | Grob |
| 4,137,999 A | * | 2/1979 | Siegert et al. .............. 184/45.1 |
| 4,308,729 A | * | 1/1982 | Condon ........................ 464/16 |
| 4,379,707 A | | 4/1983 | Fisher |
| 4,475,737 A | | 10/1984 | Cook, Jr. et al. |
| 5,226,853 A | | 7/1993 | Courgeon |
| 5,647,597 A | * | 7/1997 | Grochowski ................ 277/551 |
| 5,735,747 A | | 4/1998 | Gehrke et al. |
| 5,950,764 A | * | 9/1999 | Helbig ................... 184/105.1 |
| 6,102,804 A | | 8/2000 | Kretschmer et al. |

FOREIGN PATENT DOCUMENTS

DE 3115328 11/1982
GB 796806 6/1958

OTHER PUBLICATIONS

Permalube Permanently Lubricated Drivelines (RPL Series) from Meritor dated 11/97.

* cited by examiner

*Primary Examiner*—David Bagnell
*Assistant Examiner*—Kenneth Thompson
(74) *Attorney, Agent, or Firm*—MacMillan, Sobanski & Todd, LLC

(57) ABSTRACT

A slip joint includes a structure that prevents a negative pressure situation from occurring within a sealed lubricant chamber during operation thereof. The slip joint includes a male splined member having a plurality of external splines formed thereon that cooperate with a plurality of internal splines formed on a female splined member. The cooperating splines are disposed within a lubricant chamber defined at one end by a seal assembly and at the other end by a pressure regulator assembly. The pressure regulator assembly includes a housing having an open end that faces toward the lubricant chamber. A pressure plate is disposed within the housing of the pressure regulator assembly and is supported for sliding movement relative thereto. A spring urges the pressure plate toward the open end of the housing and the lubricant chamber. As a result, the pressure plate maintains a positive pressure situation within the lubricant chamber, thereby deterring contaminants from passing through the seal assembly into the region of the cooperating splines.

19 Claims, 1 Drawing Sheet

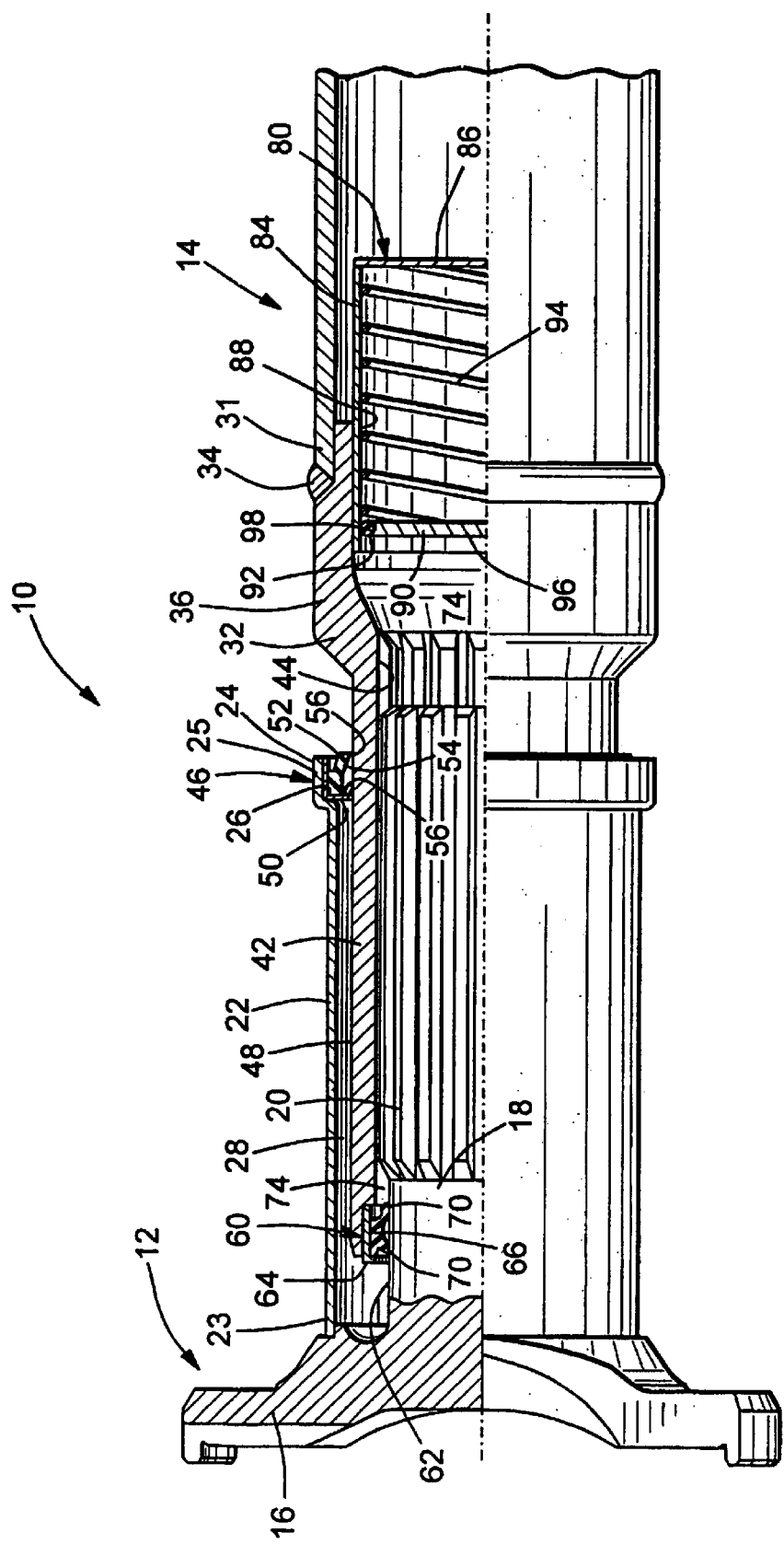

US 7,052,398 B2

PRESSURE REGULATOR ASSEMBLY FOR USE WITH A SLIP JOINT IN A DRIVESHAFT ASSEMBLY

CROSS REFERENCE TO RELATED APPLICATIONS

This application claims the benefit of U.S. Provisional Application No. 60/314,127, filed Aug. 22, 2001, the disclosure of which is incorporated herein by reference.

BACKGROUND OF THE INVENTION

This invention relates in general to a slip joint, such as is commonly used in a driveshaft assembly for transmitting rotational force or torque from an engine/transmission to an axle assembly in a vehicle drive train system. In particular, this invention relates to a pressure regulator assembly for use with such a slip joint that compresses a volume of lubricant disposed within a sealed lubricant chamber defined within the slip joint so as to maintain a positive pressure situation within the lubricant chamber and thus deter the entry of contaminants therein.

Drive train systems are widely used for generating power from a source and for transferring such power from the source to a driven mechanism. Frequently, the source generates rotational power, and such rotational power is transferred from the source to a rotatably driven mechanism. For example, in most land vehicles in use today, an engine/transmission assembly generates rotational power, and such rotational power is transferred from an output shaft of the engine/transmission assembly through a driveshaft assembly to an input shaft of an axle assembly so as to rotatably drive the wheels of the vehicle. To accomplish this, a typical driveshaft assembly includes a hollow cylindrical driveshaft tube having a pair of end fittings, such as a pair of tube yokes, secured to the front and rear ends thereof. The front end fitting forms a portion of a front universal joint that connects the output shaft of the engine/transmission assembly to the front end of the driveshaft tube. Similarly, the rear end fitting forms a portion of a rear universal joint that connects the rear end of the driveshaft tube to the input shaft of the axle assembly. The front and rear universal joints provide a rotational driving connection from the output shaft of the engine/transmission assembly through the driveshaft tube to the input shaft of the axle assembly, while accommodating a limited amount of angular misalignment between the rotational axes of these three shafts.

Not only must a typical drive train system accommodate a limited amount of angular misalignment between the source of rotational power and the rotatably driven device, but it must also typically accommodate a limited amount of relative axial movement therebetween. For example, in most vehicles, a small amount of relative axial movement frequently occurs between the engine/transmission assembly and the axle assembly when the vehicle is operated. To address this, it is known to provide a slip joint in the driveshaft assembly. A slip joint includes first and second members that have respective structures formed thereon that cooperate with one another for concurrent rotational movement, while permitting a limited amount of axial movement to occur therebetween. A typical sliding spline type of slip joint includes male and female members having respective pluralities of splines formed thereon. The male member is generally cylindrical in shape and has a plurality of outwardly extending splines formed on the outer surface thereof. The male member may be formed integrally with or secured to one of the end fittings described above to form a slip yoke. The female member, on the other hand, is generally hollow and cylindrical in shape and has a plurality of inwardly extending splines formed on the inner surface thereof. The female member may be formed integrally with or secured to an end of the driveshaft tube described above. To assemble the slip joint, the male member is inserted within the female member such that the outwardly extending splines of the male member cooperate with the inwardly extending splines of the female member. As a result, the male and female members are connected together for concurrent rotational movement. However, the outwardly extending splines of the male member can slide relative to the inwardly extending splines of the female member to allow a limited amount of relative axial movement to occur between the engine/transmission assembly and the axle assembly of the drive train system.

Frequently, the cooperating splines of the male and female splined members are disposed within a lubricant chamber that is defined between a pair of sealing structures provided on the slip joint. To accomplish this, the slip joint typically includes both an external sealing structure and an internal sealing structure. The exterior sealing structure is usually supported on the outer surface of the female splined member and extends inwardly into sliding and sealing engagement with the male splined member to prevent contaminants from entering into the region of the cooperating splines from the exterior environment. The interior sealing structure is often supported within the female splined member to prevent contaminants from entering into the region of the cooperating splines from the interior of the female splined member. A variety of such external and internal sealing structures are known in the art. The sealed lubricant chamber is usually filled with a lubricant that not only reduces the amount of sliding friction between the cooperating splines of the male and female splined members, but also substantially fills the volume of the lubricant chamber to further deter the entry of contaminants therein.

Although the use of such external and internal sealing structures has been effective, it has been found that during normal operation of the driveshaft assembly, the axial movement of the male splined member relative to the female splined member causes the volume of the lubricant chamber to vary. Such changes in the volume of the lubricant chamber can, in some instances, result in a pumping action that can discharge lubricant from the lubricant chamber and thereafter create a negative pressure situation within the lubricant chamber (i.e., a situation where the fluid pressure within the lubricant chamber is less than the fluid pressure outside of the lubricant chamber). This negative pressure situation tends to undesirably draw contaminants through either or both of the sealing structures and into the region of the cooperating splines of the male and female splined members. To prevent this from occurring, it is known to form a vent hole through one of the male and female members. The vent hole communicates with the lubricant chamber to prevent this negative pressure situation from occurring. However, the formation of a vent hole has been found to be undesirable for other reasons. Thus, it would be desirable to provide an improved structure for a slip joint that prevents a negative pressure situation from occurring within the lubricant chamber during operation thereof.

SUMMARY OF THE INVENTION

This invention relates to an improved structure for a slip joint that includes a structure that prevents a negative pressure situation from occurring within the lubricant chamber during operation thereof. The slip joint includes a male splined member having a plurality of external splines formed thereon and a female splined member having a plurality of internal splines formed thereon. The external splines of the male splined member cooperate with the internal splines of the female splined member to provide a rotational driving connection therebetween, while accommodating a limited amount of relative axial movement. The cooperating splines are disposed within a lubricant chamber defined at one end by a seal assembly and at the other end by a pressure regulator assembly that maintains a positive pressure situation within the lubricant chamber during operation thereof (i.e., a situation where the fluid pressure within the lubricant chamber is greater than or equal to than the fluid pressure outside of the lubricant chamber). To accomplish this, the pressure regulator assembly includes a housing having an open end that faces toward the lubricant chamber. A pressure plate is disposed within the housing of the pressure regulator assembly and is supported for sliding movement relative thereto. A spring urges the pressure plate toward the open end of the housing and the lubricant chamber. As a result, the pressure plate compresses the lubricant disposed within the sealed lubricant chamber and, accordingly, functions to maintain a positive pressure situation within the lubricant chamber. This positive pressure situation deters contaminants from passing through the seal assembly into the region of the cooperating splines.

Various objects and advantages of this invention will become apparent to those skilled in the art from the following detailed description of the preferred embodiment, when read in light of the accompanying drawings.

BRIEF DESCRIPTION OF THE DRAWING

The sole figure is a side elevational view, partially in cross section, of a portion of a driveshaft assembly including a sealed slip joint and a pressure regulator assembly in accordance with this invention that prevents a negative pressure situation from occurring within the slip joint during operation thereof.

DETAILED DESCRIPTION OF THE PREFERRED EMBODIMENT

Referring now to the drawing, there is illustrated a portion of a driveshaft assembly, indicated generally at 10, that can be used, for example, in the drive train system (not shown) of a land vehicle for transmitting rotational force or torque from an engine/transmission assembly to an axle assembly. However, the driveshaft assembly 10 may be used to transmit power from type of any source of power to any type of driven mechanism. Furthermore, although this invention will be described in the context of the illustrated driveshaft assembly 10, it will be appreciated that this invention may be practiced in a variety of applications other that driveshaft assemblies.

The driveshaft assembly 10 includes a slip yoke, indicated generally at 12, and a driveshaft tube, indicated generally at 14. The slip yoke 12 can be embodied as any end fitting or other member that is adapted to be connected or otherwise coupled with a cooperating component (not shown) to transmit power therebetween. For example, the slip yoke 12 can form a portion of a front universal joint (not shown) that connects an output shaft of an engine/transmission assembly to one end of the driveshaft tube 14, as described above. The other end of the driveshaft tube 14 (not shown) may be connected to a rear end fitting that forms a portion of a rear universal joint (not shown) that connects the rear end of the driveshaft tube to an input shaft of an axle assembly, as also described above.

The slip yoke 12 includes an end portion 16 having a generally cylindrical shaft portion 18 extending therefrom. The shaft portion 18 of the slip yoke 12 has a plurality of longitudinally extending external splines 20 formed thereon. The purpose for such external splines 20 will be described below. If desired, a tubular sleeve 22 can be supported on the slip yoke 12 so as to extend concentrically about the end portion 16 thereof. The tubular sleeve 22 has a first end 23 that is engaged with and supported on a shoulder formed on the end portion 16 of the slip yoke 12. The first end 23 of the tubular sleeve 22 can be secured to the slip yoke 12 in any desired manner, such as by welding, adhesives, or frictional engagement. The tubular sleeve 22 has a second end 24 that includes an enlarged diameter portion 25 defining an annular shoulder 26. The purpose for the tubular sleeve 22 will be explained below. An annular space 28 is defined between the tubular sleeve 22 and the shaft portion 18 of the slip yoke 12.

The driveshaft tube 14 is generally hollow and cylindrical in shape, having a first end 31 that is attached to a transition member 32 in any desired manner, such as by a circumferential weld 34. The transition member 32 is generally hollow and cylindrical in shape and includes a tapered portion 36 and a reduced diameter end portion 42. The end portion 42 of the transition member 32 is formed having a plurality of internal splines 44. Although the illustrated driveshaft tube 14 and transition member 32 are formed as separate components that are secured together, it will be appreciated that the internal splines 44 could be formed directly on the driveshaft tube 14, thus eliminating the need for the transition member 32 as a separate piece. The internal splines 44 of the transition member 32 cooperate with the external splines 20 of the shaft portion 18 of the slip yoke 12 to provide a rotational driving connection between the slip yoke 12 on the one hand and the transition member 32 and the driveshaft tube 14 on the other hand, while accommodating a limited amount of relative axial movement to occur therebetween.

A first seal assembly, indicated generally at 46, is provided on the second end 24 of the tubular sleeve 22 for preventing dirt, water, and other contaminants from entering into the annular space 28 defined between the tubular sleeve 22 and the shaft portion 18 of the slip yoke 12. The illustrated first seal assembly 46 is press fit within the enlarged diameter portion 25 formed in the second end 24 of the tubular sleeve 22 so as to abut the annular shoulder 26, although such is not required. The first seal assembly 46 extends inwardly into sliding and sealing engagement with an outer cylindrical surface 48 provided on the transition member 32 to prevent the contaminants from entering the annular space 28 between the tubular sleeve 22 and the shaft portion 18 of the transition member 32. To accomplish this, the first seal assembly 46 can include any suitable seal structure that provides for a sealing relationship between the outer cylindrical surface 48 of the transition member 32 and the inner surface of the sleeve 22, while permitting a limited amount of relative axial movement to occur therebetween. In the illustrated embodiment, the seal assembly 46 includes a metal annular retaining member 50 that supports an annular elastomeric lip seal 52. The lip seal 52 is disposed within an inner cylindrical surface 54 of the retaining member 50. The lip seal 52 preferably includes one or more inwardly extending wiper portions 56 that sealingly engage the outer cylindrical surface 48 of the transition member 32.

A second seal assembly, indicated generally at 60, is provided for preventing the contaminants from passing between the inner surface of the transition member 32 and outer surface of the shaft portion 18 of the slip yoke 12 into the region of the cooperating splines 20 and 44. The illustrated second seal assembly 60 is preferably press fit within the outermost end of the transition member 32 and slidably and sealingly engages an outer cylindrical surface 62 of the shaft portion 18 of the slip yoke 12. The second seal assembly 60 can include any suitable seal structure that provides for a sealing relationship between the outer cylindrical surface 62 of the shaft portion 18 of the slip yoke 12 and the inner surface of the transition member 32, while permitting a limited amount of relative axial movement to occur therebetween. In the illustrated embodiment, the second seal assembly 60 includes a metal annular retaining member 64 that supports an annular elastomeric lip seal 68. The lip seal 68 is disposed within an inner cylindrical surface of the retaining member 64. The lip seal 68 preferably includes one or more inwardly extending wiper portions 70 that slidably and sealingly engage the outer cylindrical surface 62 of the shaft portion 18 of the slip yoke 12.

Lubricant is preferably provided in the region of the cooperating splines 20 and 44 to reduce the amount of sliding friction between the slip yoke 16 and the transition member 32, and further to minimize the undesirable entry of dirt, water, and other contaminants in that region. The second seal assembly 60 defines one end of a lubricant chamber 74 that extends at least partially, and preferably completely, throughout the region of the cooperating splines 20 and 44. The other end of the lubricant chamber 74 is defined by a pressure compensator assembly, indicated generally at 80, that is disposed within the transition member 32. The pressure compensator assembly 80 is generally cylindrical in shape (although such is not required) and includes a cup-shaped housing defined by a hollow cylindrical wall portion 84 and a circular end portion 86. The hollow cylindrical wall portion 84 of the housing for the pressure compensator assembly 80 can be supported on the transition member 32 in any conventional manner. In the illustrated embodiment, for example, the hollow cylindrical wall portion 84 is press fit into a correspondingly shaped recess formed within the transition member 32. The circular end portion 86 closes one end of the hollow cylindrical wall portion 84 such that the open end of the cup-shaped housing faces toward and communicates with the lubricant chamber 74.

The pressure compensator assembly 80 further includes a circular pressure plate 90 that is slidably disposed within the hollow cylindrical wall portion 84 of the housing adjacent to the open end thereof. The pressure plate 90 sealingly engages the inner surface of the hollow cylindrical wall portion 84 so as to define an interior space within the cup-shaped housing of the pressure compensator assembly 80. If desired, an annular elastomeric seal 92 can be provided between the outer circumferential surface of the pressure plate 90 and the inner surface of the hollow cylindrical wall portion 84 to provide a fluid-tight seal therebetween. A spring 94 or other biasing structure is disposed within the interior space of the pressure compensator assembly 80 and reacts between the end portion 86 of the housing and the pressure plate 90. The spring 94 urges the pressure plate 90 toward the open end of the cup-shaped housing and the lubricant chamber 74 (toward the left when viewing the illustrated embodiment). Thus, the pressure plate 90 defines a portion of the lubricant chamber 74, and the spring 94 urges the pressure plate 90 in a direction that tends to reduce the volume of the lubricant chamber 74 and compress the lubricant therein.

As a result of this urging by the spring 94, the pressure plate 90 causes a positive pressure situation to occur within the lubricant chamber 74 (i.e., the fluid pressure within the lubricant chamber 74 is at least equal to, and preferably is somewhat greater than, the fluid pressure outside of the lubricant chamber 74). This positive pressure situation in the lubricant chamber 74 deters contaminants from passing through the second seal assembly 60 and between the inner surface of the transition member 32 and outer surface of the shaft portion 18 of the slip yoke 12 into the region of the cooperating splines 20 and 44. Preferably, the magnitude of the fluid pressure within the lubricant chamber 74 is only slightly greater than the magnitude of the fluid pressure outside thereof so that the lubricant contained within the lubricant chamber 74 is not (at least to a significant extent) urged outwardly therefrom through the second seal assembly 60.

During normal operation of the driveshaft assembly 10, the slip yoke 12 will move axially relative to the transition member 32 and the driveshaft tube 14. As a result, the volume of the lubricant chamber 74 will vary. Such changes in the volume of the lubricant chamber 74 can, without the pressure compensator assembly 80, result in a pumping action that can discharge lubricant from the lubricant chamber 74 and thereafter create a negative pressure situation within the lubricant chamber 74 (i.e., a situation where the fluid pressure within the lubricant chamber 74 is less than the fluid pressure outside of the lubricant chamber). This negative pressure situation can undesirably draw contaminants through the first and second sealing assemblies 46 and 60 and into the region of the cooperating splines 20 and 44.

By providing the above-described pressure compensator assembly 80, however, the fluid pressure within the lubricant chamber 74 can be maintained at least equal to (and preferably somewhat greater than) the fluid pressure outside of the lubricant chamber 74 (i.e., in the annular space 28 on the other side of the second seal assembly 60). The magnitude of this pressure differential is determined, among other ways, by the strength of the spring 94 contained within the pressure compensator assembly 80 and, therefore, the amount of force that is exerted by such spring 94 against the pressure plate 90. If desired, however, the strength of the spring 94 can be selected to be relatively small so as to simply minimize the occurrence of the negative pressure situations in the lubricant chamber 74, as opposed to completely eliminating such negative pressure situations. In either event, as the slip yoke 12 moves axially relative to the transition member 32 and the driveshaft tube 14, the pressure plate 90 moves under the urging of the spring 94 relative to the housing of the pressure compensator assembly 80 to automatically exert pressure against the lubricant contained in the lubricant chamber 74 and thereby maintain a relatively constant positive pressure situation within the lubricant chamber 74.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A slip joint comprising:
   a first splined member having a plurality of external splines formed thereon;
   a second splined member having a plurality of internal splines formed thereon, said external splines cooperating with said internal splines to provide a rotational driving connection between said first and second splined members, while accommodating relative axial movement therebetween;

a lubricant chamber extending throughout at least a portion of said cooperating external and internal splines; and a pressure compensating assembly including a housing that is supported on said hollow portion of said second splined members and a pressure plate that is supported within said housing so as to maintain a positive pressure situation within said lubricant chamber.

2. The slip joint defined in claim 1 wherein said lubricant chamber extends completely about said cooperating external and internal splines.

3. The slip joint defined in claim 1 wherein said pressure compensating assembly communicates with said lubricant chamber.

4. The slip joint defined in claim 1 wherein said lubricant chamber is defined by portions of said first and second splined members, a seal assembly extending between said first and second splined members, and said pressure compensating assembly.

5. The slip joint defined in claim 1 wherein said pressure plate is supported for movement relative to said housing.

6. The slip joint defined in claim 5 wherein said pressure plate defines a portion of said lubricant chamber.

7. The slip joint defined in claim 6 wherein said pressure compensating assembly further includes a biasing structure that urges said pressure plate in a direction that tends to reduce the volume of said lubricant chamber.

8. The slip joint defined in claim 7 wherein said biasing structure is a spring that is disposed within said housing and engages said pressure plate.

9. The slip joint defined in claim 1 wherein said first and second splined members are connected to components of a driveshaft assembly.

10. The slip joint defined in claim 9 wherein said first splined member is a slip yoke and said second splined member is a transition member connected to a driveshaft tube.

11. A driveshaft comprising:

an end fitting having a plurality of external splines formed thereon;

a driveshaft having a plurality of internal splines formed thereon, said external splines cooperating with said internal splines to provide a rotational driving connection betweeen said end fitting and said driveshaft, while accommodating relative axial movement therebetween;

a lubricant chamber extending throughout at least a portion of said cooperating external and internal splines; and a pressure compensating assembly including a housing that is supported on said hollow portion of said driveshaft and a pressure plate that is supported within said housing so as to maintain a positive pressure situation within said lubricant chamber.

12. The driveshaft assembly defined in claim 11 wherein said driveshaft includes a driveshaft tube that is connected to a transition member having said plurality of internal splines formed thereon.

13. The driveshaft assembly defined in claim 11 wherein said lubricant chamber extends completely about said cooperating external and internal splines.

14. The driveshaft assembly defined in claim 11 wherein said pressure compensating assembly communicates with said lubricant chamber.

15. The driveshaft assembly defined in claim 11 wherein said lubricant chamber is defined by portions of said first and second splined members, a seal assembly extending between said first and second splined members, and said pressure compensating assembly.

16. The driveshaft assembly defined in claim 11 wherein said pressure plate is supported for movement relative to said housing.

17. The driveshaft assembly defined in claim 16 wherein said pressure plate defines a portion of said lubricant chamber.

18. The driveshaft assembly defined in claim 17 wherein said pressure compensating assembly further includes a biasing structure that urges said pressure plate in a direction that tends to reduce the volume of said lubricant chamber.

19. The driveshaft assembly defined in claim 18 wherein said biasing structure is a spring that is disposed within said housing and engages said pressure plate.

* * * * *

UNITED STATES PATENT AND TRADEMARK OFFICE
CERTIFICATE OF CORRECTION

| | | |
|---|---|---|
| PATENT NO. | : 7,052,398 B2 | Page 1 of 1 |
| APPLICATION NO. | : 10/224957 | |
| DATED | : May 30, 2006 | |
| INVENTOR(S) | : Scott B. Robb | |

It is certified that error appears in the above-identified patent and that said Letters Patent is hereby corrected as shown below:

Claim 1, Column 6, Line 64 After "splined member" Insert --including a hollow portion--

Claim 1, Column 6, Line 65 After "external splines" Insert --extending within said hollow portion and--

Claim 11, Column 8, Line 1 After "a driveshaft" Insert --including a hollow portion--

Claim 11, Column 8, Line 2 After "external splines" Insert --extending within said hollow portion and--

Signed and Sealed this

Twenty-ninth Day of August, 2006

JON W. DUDAS
*Director of the United States Patent and Trademark Office*